United States Patent Office 3,692,728
Patented Sept. 19, 1972

3,692,728
HYDRAULIC BINDERS AND COMPOSITIONS INCLUDING THESE BINDERS
Bernard Bonnel, Lyon, France, assignor to Progil, Paris, France
No Drawing. Continuation of application Ser. No. 705,948, Feb. 16, 1968. This application Mar. 8, 1971, Ser. No. 122,161
Int. Cl. C04b 7/32
U.S. Cl. 260—29.4 UA    4 Claims

ABSTRACT OF THE DISCLOSURE

Compositions for mortars and cements which harden rapidly and give great resistance including a hydraulic binder of high alumina cement and a polymer of acrylamide and formaldehyde and a polymerization catalyst.

This application is a continuation of co-pending application Ser. No. 705,948 filed Feb. 16, 1968, now abandoned.

An object of the present invention is to provide new hydraulic binders including high-alumina cement and polymeric acrylic derivatives. It relates also to compositions of quick-hardening mortar and concrete, having exceptional resistance qualities.

It is known to make mortars with accelerated hardening properties, using as a hydraulic binder, the commercial product known under the generic terms "high alumina cements." The mortars obtained in this way generally harden in less than 24 hours and have high resistance to compression. However, though these mortars generally acquire desirable mechanical properties, their resistance to traction and particularly to flexion is much too little for many applications.

Moreover, attempts have been made to modify the properties of known mortars made of various types of aggregates and hydraulic binders, by incorporating into these mixtures some adjuvants, especially polymeric or polymerizable in situ acrylic derivatives. For example, it has been proposed to substitute a liquid resin, such as an acrylic resin, for a part of the mixing water of mortars, in order to suppress the disadvantages due to the presence of a great quantity of water in the mixture.

Compounds, such as a partly hydrolyzed polyacrylamide or polyacrylic acid, which have the property, under certain conditions, of delaying mortar setting have also been used.

It has also been proposed to introduce into the aggregate and the hydraulic binder, copolymerizable mixtures of alkylidene bisacrylamide and of another ethylenic comonomer, associated with a polymerization catalytic system. This method is only applied when using slow-setting cements to quicken the setting time. An increase of compression resistance has been noted after 28 days, but this increase does not exceed 50% with respect to the resistance obtained with a similar mortar without the added acrylic mixture.

There has also been described recently a method of modifying hydraulic binders by incorporation therein of polyvalent metal salts of methacrylic and acrylic acids, possibly associated with a polymerization catalyst. According to the proportion of acrylic salt added to cement, the proportion which may reach 1.5 times the weight of the cement, hard or plastic mortars are obtained. As in the previously cited case, this treatment is applied to slow-setting hydraulic binders to reduce appreciably the hardening and setting times. However, the resistances of the mortars obtained remain of the same order as the ones of classical mortars.

On the contrary, applicant has now found that starting with a quick-haredning hydraulic binder, it is possible by treatment with specific mixtures based on organic acrylic derivatives simultaneously to give to the final products greatly improved properties.

Thus, the new compositions according to the present invention yield mortars which have both the advantages of a quick-hardening time as well as considerable mechanical resistances and to obtain these resistances in a very short time as compared to the prior compositions.

Moreover, these compositions have the advantage of adhering very well to the surfaces to which they may be applied, such as wood, metals, plastics, building materials, etc.

Finally, the process of preparation of the compositions according to the present invention is very easy to use.

In its most general form the invention relates to compositions of cements, mortars and concretes obtained from the following constituents:

a quick-hardening hydraulic binder of the high-alumina cement type,
an aqueous solution of a mixture of acrylamide monomer and formaldehyde, and
a polymerization catalytic system for the acrylic mixture.

There may also be added to the basic composition a filler of known type such as sand, gravel, clay or mixtures of these, a polymerization retarder for the acrylic mixture and possibly a supplementary proportion of water.

The high alumina cement used as the first ingredient, also known as aluminous cement, is not a portland cement. It is a cement having a high percentage of at least 30% alumina of which the essential constituent is monocalcium aluminate. Well know, particularly in Europe, under the name "ciment fondu," it can be distinguished from classical cements, as for example portland cement which contains about 5% alumina, by its appearance, its composition and its particular properties, particularly the relatively slow time of setting but rapid hardening. Commercial products may be used in accordance with the normal conditions as described by the manufacturers. High alumina cement is defined in Duriez—"Nouveau traite de materiaux de construction" volume 1, pages 352–353; also in "The Condensed Chemical Dictionary" by Rose under "cement, aluminous (high alumina cement)."

The composition and the grain size of the filler are chosen with regard to the use contemplated for the final mortar. Its characteristics have no effect on the properties of the compositions according to the invention. It is however preferable to use a filler free from moisture, as the presence of water can have an influence on the hydraulic binder before mortar preparation.

The aqueous solution of acrylamide monomer and formaldehyde mixture may contain any proportion of dry extract; however in order to avoid the handling of a liquid which is too fluid or too viscous, it is proposed to use a solution containing 30 to 60% of dry extract.

The acrylamide and formaldehyde mixture, by itself, is obtained by contacting an acrylamide aqueous solution and a formaldehyde aqueous solution at a temperature from 20 to 70° C. in the presence of a basic catalyst, as, for example, sodium carbonate or a sodium hydroxide aqueous solution. It is possible to react in this way 0.5 to 1.5 moles of formaldehyde to each mole of acrylamide.

The catalyst used in the compositions according to the invention may be chosen from known polymerization catalysts, such as organic peroxides, as benzoyl peroxide, persalts, as potassium persulfate, redox systems (for example chloric acid-alkali metal bisulfide) possibly along with organic or inorganic acids or with water soluble alkaline agents such as hydroxides or carbonates. According to a preferred form of the invention a solid water-soluble catalyst is used or a catalytic combination of two constituents, one of which is solid and the other liquid, as, for example, an alkali metal persulfate activated by means of a liquid dialkylaminopropionitrile.

The polymerization retarder has the purpose of lengthening the duration of the initiation phase, preliminary to the propagation of the macromolecular chains, in the polymerization of the acrylic mixture. For this purpose, known types of inhibitors can be used. For example, potassium ferricyanide is particularly suitable.

The compositions according to the invention are obtained at the time of use by contacting two mixtures, one in powder form and the other one in liquid form.

The pulverulent mixture contains the high alumina cement, the filler, as well as the catalyst or the solid catalytic constituent for the polymerization of the acrylic mixture.

The liquid composition contains the aqueous solution of acrylamide and formaldehyde mixture, brought to the desired dilution by means of an additional quantity of water, the catalytic liquid constituent for polymerization, as well as the polymerization retarding agent.

Each of the mixtures prepared in this way may be kept separately before using for a period of time up to several months, under normal conditions, that is in an essentially dry atmosphere for powder. On the other hand, it is, of course, imperative that the liquid composition does not contain all of the catalytic system for inducing the polymerization of acrylamide and formaldehyde in the stored mixture.

In order to insure best use of the liquid composition, it is recommended that it be stored in a plastic receptacle or one provided with an interior plastic envelope, because metals, such as iron, even in traces, can provoke a very rapid mass setting of the liquid.

The respective ratio of the constituents may vary within large limits to yield the qualities desired for the final mortar.

In general, an acrylamide and formaldehyde mixture quantity corresponding to a polymer proportion of between 3 and 10% of the total weight of the final product, yielded a series of mortars usable in a very large range of applications. Less than 3% of the mixture resulted in a practically negligible improvement in the mechanical qualities of the composition as compared to mortars of high alumina cements. Further, it is not necessary to utilize quantities greater than 10%, since the improvement in the properties of the final products does not justify the resulting increase in cost.

Moreover, research has shown that for the other ingredients comprising the compositions according to the invention better results were obtained with the following percentages:

In the pulverulent mixture, the proportion by weight of the high alumina cement may be between 50 and 90%—preferably 60-80%—without taking into account the polymerization catalyst, the complement to 100% comprising the filler and the solid catalytic system.

The quantity of water which may be added to the aqueous solution of formaldehyde and acrylamide mixture depends upon the initial concentration of this solution and upon the percentage of the desired polymerized product in the final mortar. It can be easily determined with regard to these variables.

The proportion of the liquid to be used with regard to the pulverulent mixture may also vary. However, better results are obtained when the quantity of liquid is between 0.25-0.30 part by weight per part of powder, which represents about 20-25% of the total weight of the mortar.

The quantity of the catalyst to be introduced into the compositions according to invention may vary between 0.1–1% with regard to the final mortar total weight. This may be a solid catalyst, for example a persalt which is added to the powder. It is also possible to partially replace the latter in a proportion of up tho 0.1% of final mortar total weight by an activating agent such as diethylaminopropionitrile, which is mixed with the liquid. This compound has a polymerization catalytic action only in the presence of persalt and does not induce any modification of the formaldehyde and acrylamide mixture during storage. The quantity of catalyst may be varied within the above indicated limits in order to regulate mortar setting time.

Finally, the proportion of the polymerization retarding agent introduced into the liquid composition can vary advantageously between 0.01–0.03% by weight of the aforesaid composition.

The preparation of the composition according to the invention is extremely simple. It consists in introducing the liquid into the pulverulent product in convenient proportions at the time of use and in mixing these constituents, preferably with intense stirring, until a very fluid homogeneous paste is obtained, which is easily manageable before mass setting.

The various reactions which take place when contacting the powder and liquid, namely hydration, then hardening the cement and polymerization of the acrylamide and formaldehyde mixture, have a favorable action upon one another. The hydration of the cement induces a slight increase of temperature of the mixture which gives rise to acrylic mixture polymerization, and this reaction being strongly exothermic quickens cement hardening. Although the whole of the reaction mechanism has not been studied in all its complexity, it is likely that it is this reciprocal action which results in mortar compositions reaching resistances which until now have never been able to be obtained.

The applications of the compositions according to the invention are numerous because of the qualities presented by these compositions. They may be used advantageously by thick injections, for filling the fissures in the worked concrete. With these compositions may be made thin covers and ground coatings which harden very quickly. An application giving especially good results in the use of mortars according to the invention in sealing operations, especially in the sealing of anchor rods used in mine ground supporting or further for the positioning of cables by pumping mortar a long distance. The compositions can also be used for joint making, consolidation of soils, etc.

All these applications are accomplished in the same way as in the case of known mortars, that is by injection, molding and framing of the paste prepared in accordance with the previously indicated conditions.

The examples hereinafter given in a nonlimitative way, are to clarify the exceptional properties of the compositions according to the invention.

EXAMPLE 1

The following two types of formulations, which had been stored at 190° ±1° C. were used:

Pulverulent formula

|  | G. |
|---|---|
| Cement "Fondu Lafarge" | 320 |
| Dry Fontainebleau sand | 70 |
| Ammonium persulfate | 2 |

Liquid formula

|  | G. |
|---|---|
| Aqueous solution of monomeric acrylamide and formaldehyde at 44% of the dry extract | 96 |
| Additional water | 19.8 |
| Diethylaminopropionitrile (solution of 5% by weight) | 4.2 |
| Potassium ferricyanide | 0.0132 |

A mortar paste was prepared by pouring the liquid all at one time into the powder and by stirring intensely for some seconds. A very fluid paste is obtained which can be easily conducted by a pump.

The paste was molded in the test-tubes described in the standard AFNOR (P 15,401) and traction tests were made according to prescriptions of the standard. The results obtained are reproduced in Table 1 hereafter where each figure represents an average of three specimens.

The setting time measured by means of a Vicat needle, according to the standard AFNOR P 15,431 was 15–17 minutes at a temperature of 20±1° C.

TABLE 1

| Elapsed time until measurement in days: | Traction resistance in kg./cm.² |
|---|---|
| 1 | 73.2 |
| 2 | 89 |
| 3 | 92.5 |
| 6 | 117.3 |
| 7 | >120 |

As a comparison, it should be noted that a mortar with 80% by weight of high alumina type cement as "Fondu Lafarge," without the acrylic mixture, has a traction resistance at the end of 2 days of 48 kg./cm.² and after 6 days, a resistance reaching hardly 50 kg./cm.².

Tests for resistance to flexion, conducted according to the standard AFNOR P 15,451 have furnished excellent results given in Table 2 hereafter:

TABLE 2

| Elapsed time until measurement in days: | Resistance to flexion in kg./cm.² |
|---|---|
| 1 | 99 |
| 3 | >150 |
| 7 | >150 |

EXAMPLE 2

Under the same conditions as in Example 1, mortar samples were prepared according to the invention, starting with a paste obtained by mixing the following two formulations stored at 19°±1° C.

Pulverulent formula

| | G. |
|---|---|
| Cement "Fondu Lafarge" | 280 |
| Dry Fontainebleau sand | 118 |
| Ammonium persulfate | 2 |

Liquid formula

| | G. |
|---|---|
| Aqueous solutions of monomeric acrylamide and formaldehyde at 50% of dry extract | 96 |
| Additional water | 19.8 |
| Diethylaminopropionitrile (aqueous solution of 5% by weight) | 4.2 |
| Potassium ferricyanide | 0.036 |

Setting time measured under the same conditions as in Example 1 was 28–30 minutes at a temperature of 20°±1° C.

Flexion and traction resistance tests were conducted according to the standards AFNOR P 15,451 and P 15,401. The results obtained are reproduced in Table 3 hereafter.

TABLE 3

| Elapsed time until measurement | Resistance to flexion in kg./cm.² | Resistance to traction in kg./cm.² |
|---|---|---|
| Days: | | |
| 1 | 108 | 68.3 |
| 2 | | 90 |
| 3 | 147 | |
| 5 | | 109 |
| 7 | >150 | >120 |

It will be obvious to those skilled in the art that various changes may be made without departing from the scope of the invention and the invention is not to be considered limited to what is described in the specification.

What is claimed is:

1. A composition for forming mortars and cements of very great resistance and rapid hardening consisting essentially of 75–80% by weight of a pulverulent material and 20–25% by weight of a liquid material, said pulverulent material including 50–90% by weight of an aluminous cement containing at least 30% alumina and 0.1–1% with respect to the final mortar weight of a catalyst capable of causing a polymerization reaction between acrylamide monomer and formaldehyde and selected from the group consisting of organic peroxides, persalts and redox catalysts, and said liquid material comprising an aqueous solution of 30–60% by weight of dry extract of acrylamide monomer and formaldehyde in the proportion of 0.1–1.5 moles of formaldehyde per mole of acrylamide.

2. A composition according to claim 1 wherein said catalyst is an alkali metal or ammonium persulfate and said liquid material further contains up to 0.1% by weight of a dialkylamino propionitrile.

3. A composition according to claim 2 wherein said catalyst further contains 0.01 to 0.03% potassium ferricyanide polymerization retarder.

4. A composition for forming mortars and cements of very great resistance and rapid hardening consisting essentially of 75–80% by weight of a pulverulent material and 20–25% by weight of a liquid material, said pulverulent material including 50–90% by weight of an aluminous cement, 10–50% by weight of a siliceous filler and 0.1–1% by weight of alkali metal or ammonium persulfate, and said liquid material comprising an aqueous solution of 30–60% of a dry extract of acrylamide monomer and formaldehyde in the proportions of 0.5–1.5 mole of formaldehyde per mole of acrylamide monomer, up to 0.1% by weight of dialkylaminopropionitrile and 0.01–0.03% of potassium ferricyanide polymerization retarder.

References Cited

UNITED STATES PATENTS 3,591,542   7/1971   Bonnel et al. _____ 260—39 R

LORENZO B. HAYES, Primary Examiner

U.S. Cl. X.R.

106—104; 260—395 B

UNITED STATES PATENT OFFICE
CERTIFICATE OF CORRECTION

Patent No. 3,692,728          Dated September 19, 1972

Inventor(s) Bernard BONNEL

It is certified that error appears in the above-identified patent and that said Letters Patent are hereby corrected as shown below:

Priority omitted:

PV 48,363 filed in France 3/3/67

Column 2, line 2, "haredning" should be -- hardening --
    (page 2, line 29)

Column 2, line 34, "know" should be -- known --

Signed and sealed this 17th day of April 1973.

(SEAL)
Attest:

EDWARD M. FLETCHER, JR.          ROBERT GOTTSCHALK
Attesting Officer                    Commissioner of Patents